(12) United States Patent
Kwak et al.

(10) Patent No.: US 7,365,823 B2
(45) Date of Patent: Apr. 29, 2008

(54) METHOD FOR CUTTING LIQUID CRYSTAL DISPLAY PANEL AND METHOD FOR FABRICATING INDIVIDUAL LIQUID CRYSTAL DISPLAY CELLS USING THE SAME

(75) Inventors: Dong-Yeung Kwak, Daegu (KR); Seung-Chan Shin, Daegu (KR); Sung-Ho Hong, Incheon (KR); Wang-Seob Kil, Daejeon (KR)

(73) Assignee: LG.Philips LCD Co., Ltd., Seoul (KR)

( * ) Notice: Subject to any disclaimer, the term of this patent is extended or adjusted under 35 U.S.C. 154(b) by 417 days.

(21) Appl. No.: 10/856,810

(22) Filed: Jun. 1, 2004

(65) Prior Publication Data
US 2004/0261589 A1     Dec. 30, 2004

(30) Foreign Application Priority Data
Jun. 24, 2003   (KR) ................ 10-2003-0041288

(51) Int. Cl.
*G02F 1/1339* (2006.01)

(52) U.S. Cl. ........................ 349/187; 349/190

(58) Field of Classification Search ............... 349/187, 349/190
See application file for complete search history.

(56) References Cited

U.S. PATENT DOCUMENTS 6,195,149 B1 * 2/2001 Kodera et al. ............... 349/187
6,870,594 B1 * 3/2005 Zhang ........................ 349/187
6,890,786 B2 * 5/2005 Walker et al. ................ 438/48

FOREIGN PATENT DOCUMENTS

JP         09-325328         12/1997

* cited by examiner

*Primary Examiner*—Michael H. Caley
(74) *Attorney, Agent, or Firm*—Morgan, Lewis & Bockius LLP

(57) ABSTRACT

A method for cutting a liquid crystal display panel includes forming a first scribe line along attached first and second mother substrates to form a first region having a plurality of first-sized LCD panels and a first edge of the first region and to form a second region having a plurality of second-sized LCD panels and a first edge of the second region, separating the plurality of first-sized LCD panels formed at the first region into individual first-sized LCD panels, and separating the plurality of second-sized LCD panels formed at the second region into individual second-sized LCD panels.

19 Claims, 6 Drawing Sheets

METHOD FOR CUTTING LIQUID CRYSTAL DISPLAY PANEL AND METHOD FOR FABRICATING INDIVIDUAL LIQUID CRYSTAL DISPLAY CELLS USING THE SAME

The present invention claims the benefit of Korean Patent Application No. 41288/2003 filed in Korea on Jun. 24, 2003, which is hereby incorporated by reference.

BACKGROUND OF THE INVENTION

1. Field of the Invention

The present invention relates to a method for cutting a display panel and method for fabricating individual display cells, and particularly, to a method for cutting a liquid crystal display (LCD) panel and method for fabricating individual liquid crystal display cells using the same 2. Description of the Background Art In general, an LCD device includes a matrix array of LCD cells supplied with data signals to control light transmittance of the LCD cells to display images. The LCD device is fabricated by forming a plurality of thin film transistor (TFT) array substrates on a first large-sized mother substrate, which is commonly formed of glass, and a plurality of color filter substrates on a second large-sized mother substrate. Then, the first and second large-sized mother substrates are attached to each other to form a plurality of unit LCD panels. Next, the attached first and second large-sized mother substrates undergo a cutting process to produce a plurality of individual unit LCD panels. The cutting process is commonly performed by forming a groove on a surface of one of the mother substrates using a cutting wheel having a hardness greater than a hardness of the glass mother substrates, and breaking the glass substrate along the groove. A cutting process of a unit liquid crystal display panel will now be described with reference to accompanying drawings.

Figure 1:
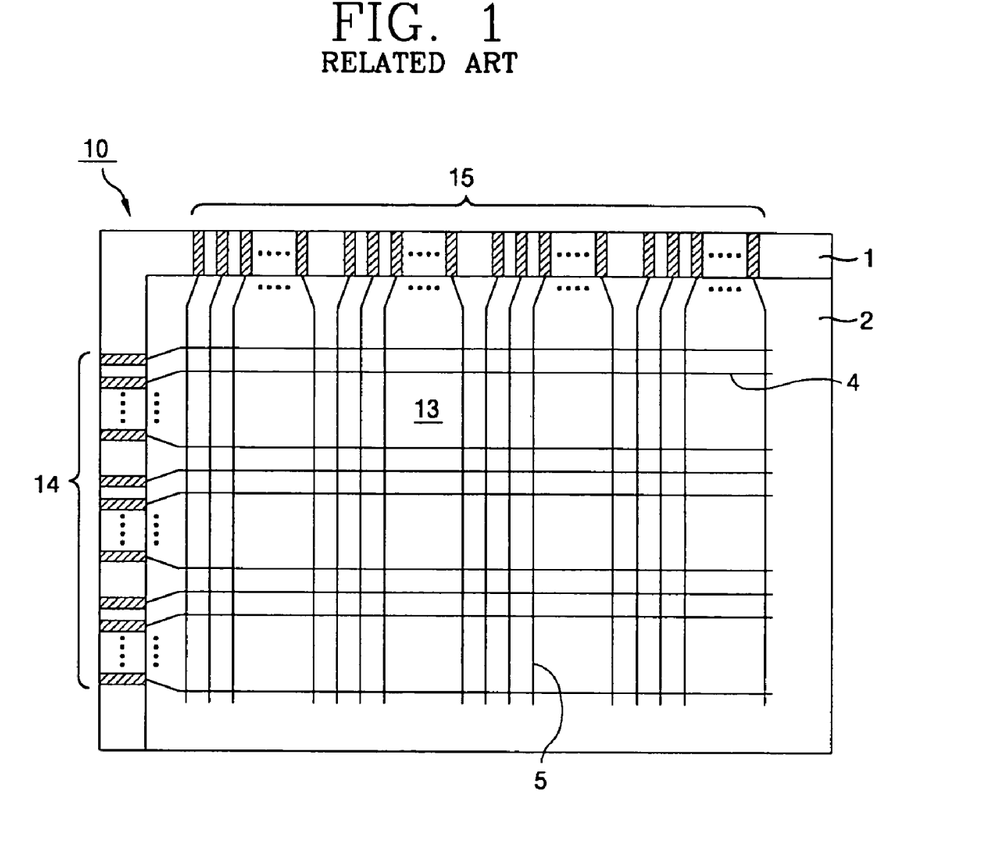
FIG. 1 is a schematic plan view of a unit LCD panel according to the related art.

FIG. 1 is a schematic plan view of a unit LCD panel according to the related art. In FIG. 1, a liquid crystal display panel 10 includes an image display part 13 where LCD cells are arranged in a matrix configuration, a gate pad part 14 connected with gate lines 4 of the image display part 13, and a data pad part 15 connected with data lines 5 of the image display part 13. As shown in FIG. 1, one long side and one short side of a TFT array substrate 1 protrude from sides of a color filter substrate 2. Accordingly, the gate pad part 14 is formed at the protruding short side of the TFT array substrate 1, and the data pad part 15 is formed at the protruding long side of the TFT array substrate 1.

The gate pad part 14 supplies scan signals supplied from a gate driving part to the gate lines 4 of the image display part 13, and the data pad part 15 supplies image information supplied from a data driving part to the data lines 5 of the image display part 13. The gate lines 4 and the data lines 5 intersect at the image display part 13 of the TFT array substrate 1, wherein a unit pixel is formed in a region where the gate and data lines 4 and 5 intersect. In addition, each unit pixel includes a TFT to function as a switching element and a pixel electrode connected to the TFT.

The image display part 13 of the color filter substrate 2 is provided with a color filter that is separated into a plurality of cell areas by a black matrix and a common electrode that correspond to a pixel electrode formed at the TFT array substrate 1.

The TFT array substrate 1 and the color filter substrate 2 are attached together by a sealant (not shown) formed at an outer edge of the image display part 13. In addition, spacers are provided between the attached TFT array substrate 1 and color filter substrate 2 to maintain a uniform cell-gap therebetween. Accordingly, a liquid crystal layer (not shown) is formed within the uniform cell-gap between the TFT array substrate 1 and the color filter substrate 2.

Figure 2:
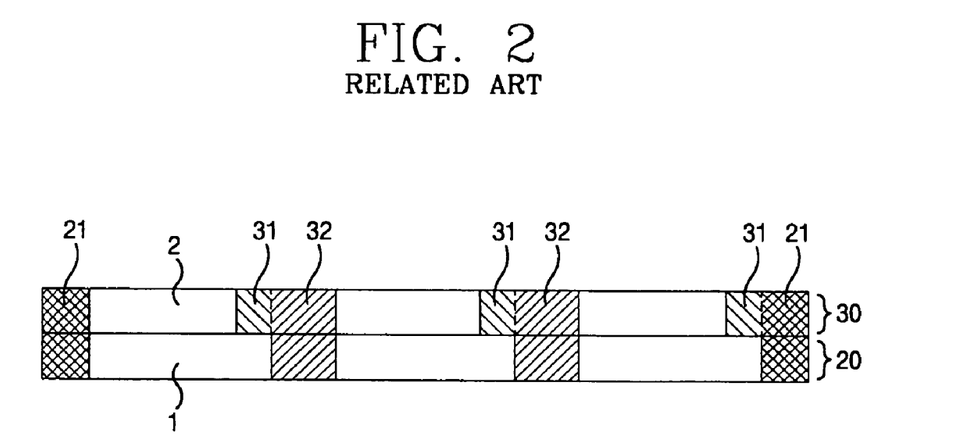
FIG. 2 is a cross sectional view of a plurality of LCD panels according to the related art.

FIG. 2 is a cross sectional view of a plurality of LCD panels according to the related art. In FIG. 2, since each of the unit LCD panels is formed such that one side of the TFT array substrate 1 is formed to protrude from the color filter substrate 2, each of the color filter substrates 2 formed on a second mother substrate 30 is mutually isolated from one another by a dummy region 31. The dummy region 31 corresponds to an area where each of the TFT array substrates 1 protrude from the color filter substrates 2.

In addition, each of the unit LCD panels is positioned to maximize useable areas of the first and second mother substrates 20 and 30. For example, each of the unit LCD panels are formed isolated from one another by a dummy region 32, and in order to accommodate for a process margin a dummy region 21 is formed at an edge of the first and second mother substrates 20 and 30.

After the first and second mother substrates 20 and 30 are attached to each other, the attached first and second mother substrates 20 and 30 are cut into a plurality of individual LCD panels. Accordingly, the dummy region 32 are removed, and the dummy region 31 formed at the area where the color filter substrates 2 of the second mother substrate 30 are isolated.

Figure 3:
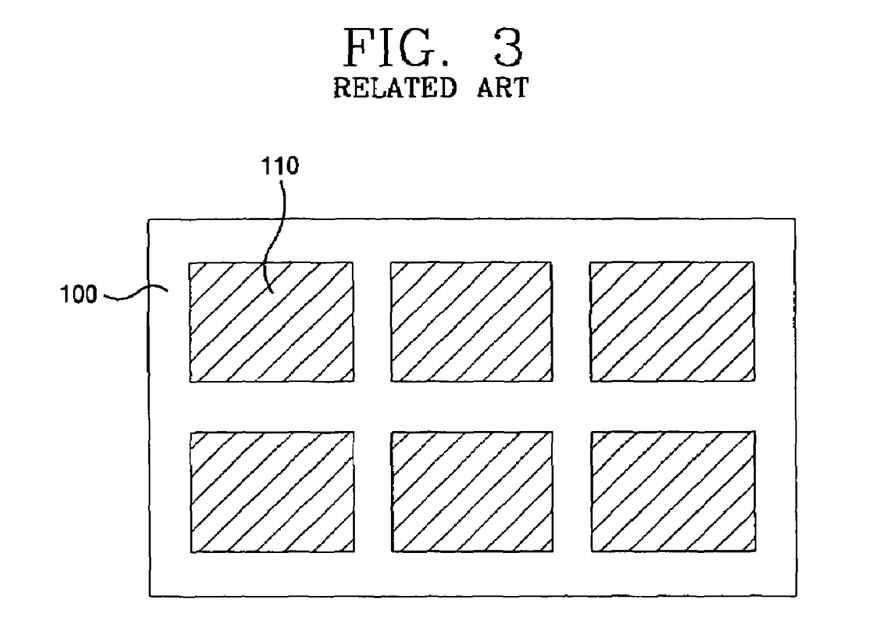
FIG. 3 is a schematic plan view of a plurality of LCD panels according to the related art.
Figure 4:
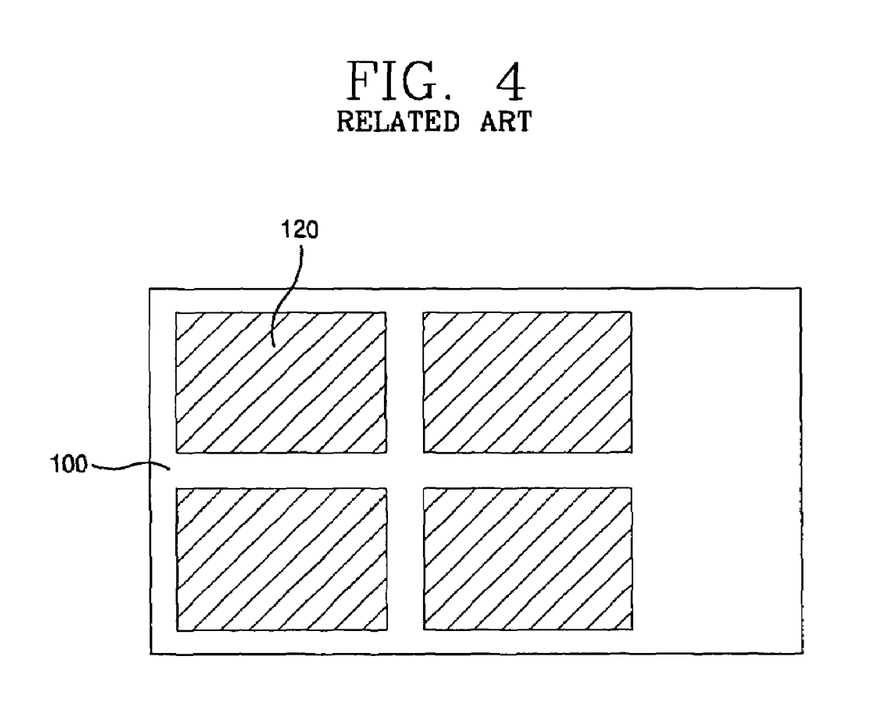
FIG. 4 is a schematic plan view of a plurality of LCD panels according to the related art.

FIG. 3 is a schematic plan view of a plurality of LCD panels according to the related art, and FIG. 4 is a schematic plan view of a plurality of LCD panels according to the related art. In FIG. 4, when bigger-sized LCD panels 120 are fabricated on a mother substrate 100, as compared to the LCD panels 110 I FIG. 3, only four LCD panels 120 can be formed on a portion of the mother substrate 100. Accordingly, a large amount of the mother substrate 100 is discarded, thereby creating a significant amount of waste, increasing production costs, and reducing manufacturing efficiency.

SUMMARY OF THE INVENTION

Accordingly, the present invention is directed to a method for cutting an LCD panel and method for fabricating individual LCD cells using the same that substantially obviates one of more of the problems due to limitations and disadvantages of the related art.

An object of the present invention is to provide a method for cutting an LCD panel having a simplified alignment process.

Another object of the present invention is provide a method for fabricating individual LCD cells having a simplified process.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a method for cutting a liquid crystal display panel includes forming a first scribe line along attached first and second mother substrates to form a first region having a plurality of first-sized LCD panels and a first edge of the first region and to form a second region having a plurality of second-sized LCD panels and a first edge of the second region, separating the plurality of first-sized LCD panels formed at the first region into individual first-sized LCD panels, and separating the plurality of second-sized LCD panels formed at the second region into individual second-sized LCD panels.

In another aspect, a method for fabricating individual liquid crystal display cells includes attaching first and second mother substrates together, forming a first scribe line within a first scribe line region along the attached first and second mother substrates to form a first panel having a plurality of first-sized LCD panels and a first panel edge of the first panel, and to form a second panel having a plurality of second-sized LCD panels and a first panel edge of the second panel, removing an end portion of the first panel to form a second panel edge of the first panel opposite to the first panel edge of the first panel, removing an end portion of the second panel to form a second panel edge of the second panel opposite to the first panel edge of the second panel, separating the plurality of first-sized LCD panels formed at the first region into individual first-sized LCD cells, and separating the plurality of second-sized LCD panels formed at the second region into individual second-sized LCD cells.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a unit of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 5A:
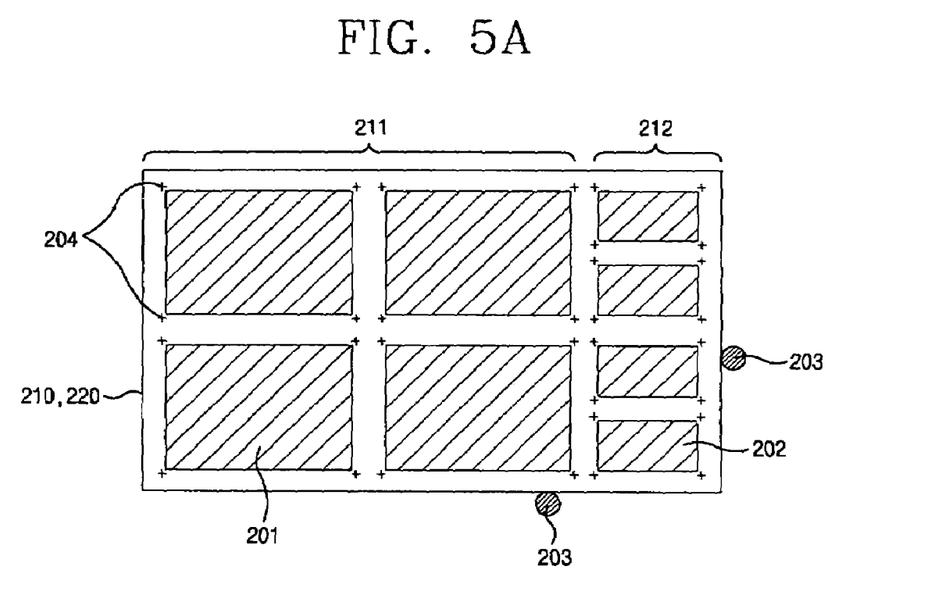
FIGS. 5A and 5B are schematic plan views of exemplary mother substrates according to the present invention.
Figure 5B:
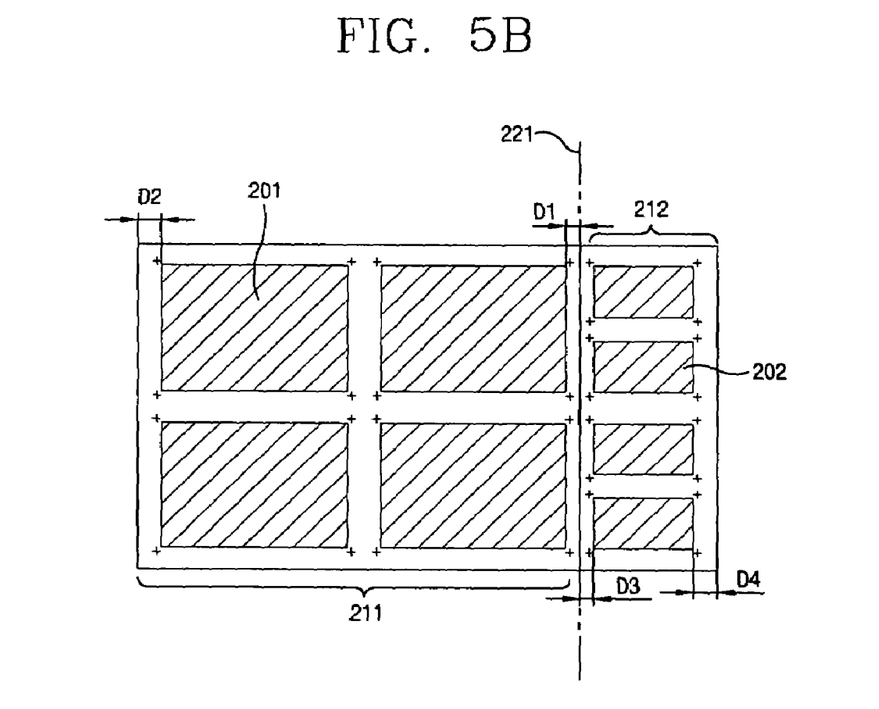

FIGS. 5A and 5B are schematic plan views of exemplary mother substrates according to the present invention. In FIGS. 5A and 5B, first and second mother substrates 210 and 220 may include a first region 211 fabricated to include a plurality of first LCD panels 201 each having a first size and isolated at certain intervals therein, and a second region 212 fabricated to include a plurality of second LCD panels 202 each having a second size and isolated at certain intervals therein. Accordingly, maximum efficiency may be obtained by making use of all useable space on the first and second mother substrates 210 and 220.

In FIGS. 5A and 5B, a plurality of alignment keys 204 may be formed at corner regions of each of the LCD panels 201 and each of the LCD panels 202. In addition, a plurality of alignment pins 203 may be provided by a cutting apparatus, thereby aligning the attached first and second mother substrates 210 and 220 with the cutting apparatus.

Although not specifically shown, each of the LCD panels 201 and 202 may be attached to each other along one short side and one long side of a TFT array substrate that may protrude from a color filter substrate. In addition, a gate pad part may be formed at the protruding one short side of the TFT array substrate, and a data pad part may be formed at the protruding one long side of the TFT array substrate.

In FIG. 5B, a first region 211 where first-sized LCD panels 201 are formed and a second region 212 where second-sized LCD panels 202 are formed are aligned with a cutting apparatus, as detailed above. Then, a first scribing line 221 may be formed between the first region 211 and the second region 212 to separate the first region and the second region 212. Accordingly, a distance (D1) between the first-sized LCD panels 201 and the first scribing line 221 and a distance (D2) between the first-sized LCD panels 201 and an end portion of the first region 211 may be different from each other. In addition, a distance (D3) between the second-sized LCD panels 202 and the first scribing line 221 and a distance (D4) between the second-sized LCD panels 202 and an end portion of the second region 212 may be different from each other.

An exemplary method for cutting an LCD panel to produce a plurality of individual LCD panels fabricated on the attached mother substrates of FIGS. 5A and 5B may include a first alignment of the first and second mother substrates 210 and 220 with a cutting apparatus using the alignment pins 203, and a second alignment using the alignment keys 204. For example, the first alignment may include manual alignment of the attached first and second substrates 210 and 220 to contact the alignment pins 203 of the cutting apparatus. Then, the second alignment may include an imaging system for detecting coordinates of the alignment keys 204 to provide reference coordinates.

Figure 6A:
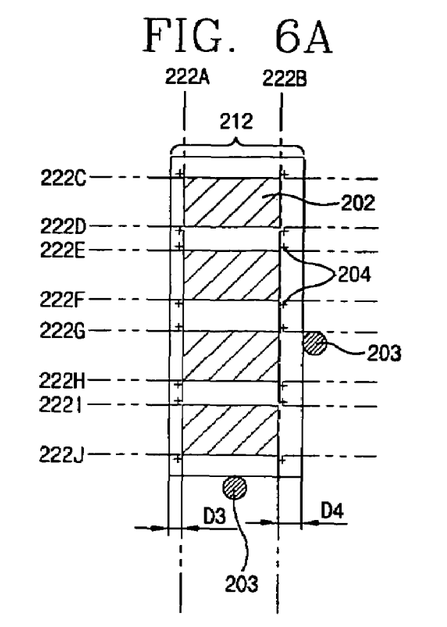
FIGS. 6A and 6B are schematic plan views of an exemplary cutting process of LCD panels according to the present invention.
Figure 6B:
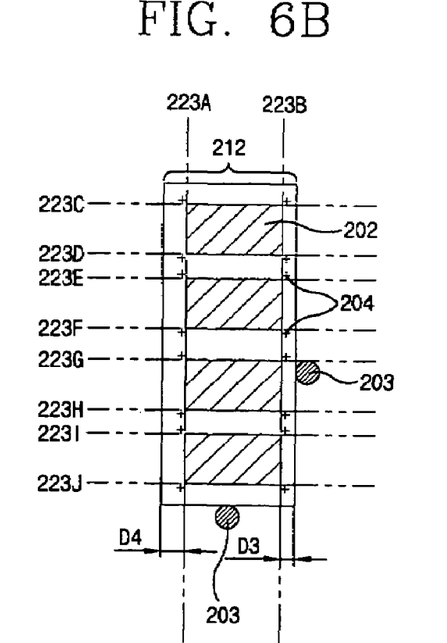

FIGS. 6A and 6B are schematic plan views of an exemplary cutting process of LCD panels according to the present invention. In FIG. 6A, the separated second region 212 may be aligned with the cutting apparatus using the alignment pins 203 and the alignment keys 204, and second scribing lines 222A-222J may be formed along long sides and short sides of the second-sized LCD panels. For example, a first alignment may use the alignment pins 203 and a second alignment may use the alignment keys 204, wherein an imaging system may detect coordinates of the alignment keys 204, and the second region 212 may be positioned at reference coordinates. For example, an imaging device may move to predetermined reference coordinates to detect coordinates of the alignment key 204. Then, the detected coordinates of the alignment key 204 may be compared with the reference coordinates, wherein the second region 212 may be aligned with the cutting apparatus so that the coordinates of the alignment key 204 may correspond to the reference coordinates.

In FIG. 6B, the second region 212 may be overturned and aligned with the cutting apparatus, as detailed above. Then, by applying force to the surface of the second region 212, a split may be formed along the second scribing lines 222A-

222J, and third scribing lines 223A-223J may be formed along long sides and short sides of the second-sized LCD panels 202 using alignment process detailed above.

Then, the second region 212 is again overturned and aligned with the cutting apparatus. Next, a split is generated along the third scribing lines 223A-223J by supplying a force to a surface of the second region 212. Accordingly, the second-sized LCD panels 202 are individually separated from the second region 212 by the splits generated along the second scribing lines 222A-222J and third scribing lines 223A-223J.

However, since the distance (D3) between the second-sized LCD panels 202 and the first scribing line 221 and the distance (D4) between the second-sized LCD panels 202 and an end portion of the second region 212 are different from each other, each time the second region 212 is overturned, positions of the alignment keys 204 formed at the corners of the second-sized LCD panels 202 are changed. Accordingly, when the imaging system moves to predetermined reference coordinates, coordinates of the alignment keys 204 formed at the corners of the second-sized LCD panel 202 may not be detected. Thus, reference coordinates of the imaging system may need to be corrected, thereby reducing production efficiency.

Figure 7A:
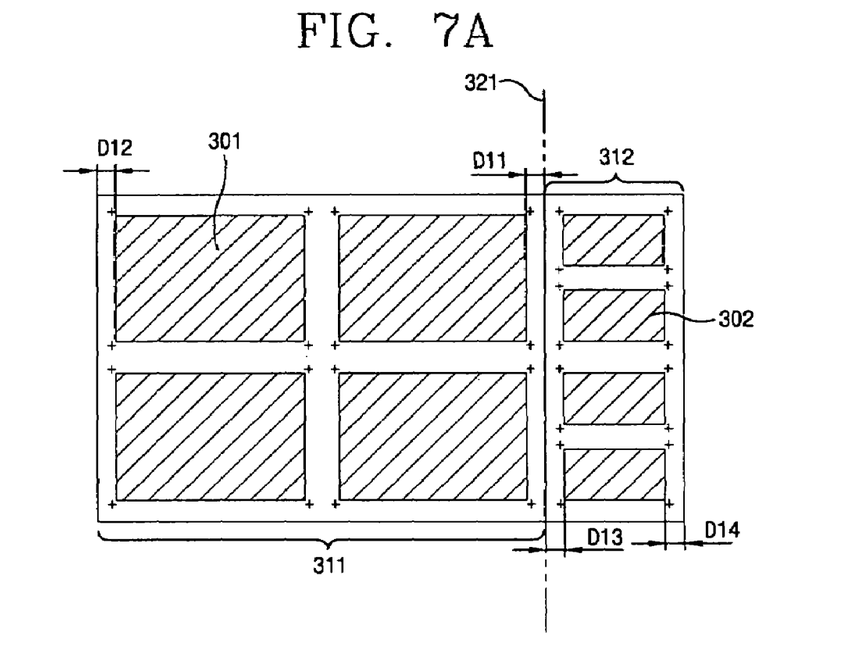
FIGS. 7A to 7C are schematic plan views of another exemplary cutting process of LCD panels according to the present invention.
Figure 7B:
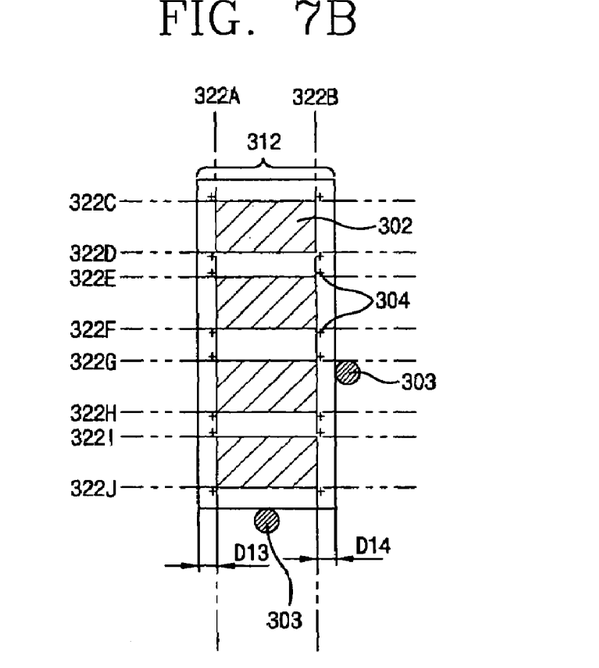
Figure 7C:
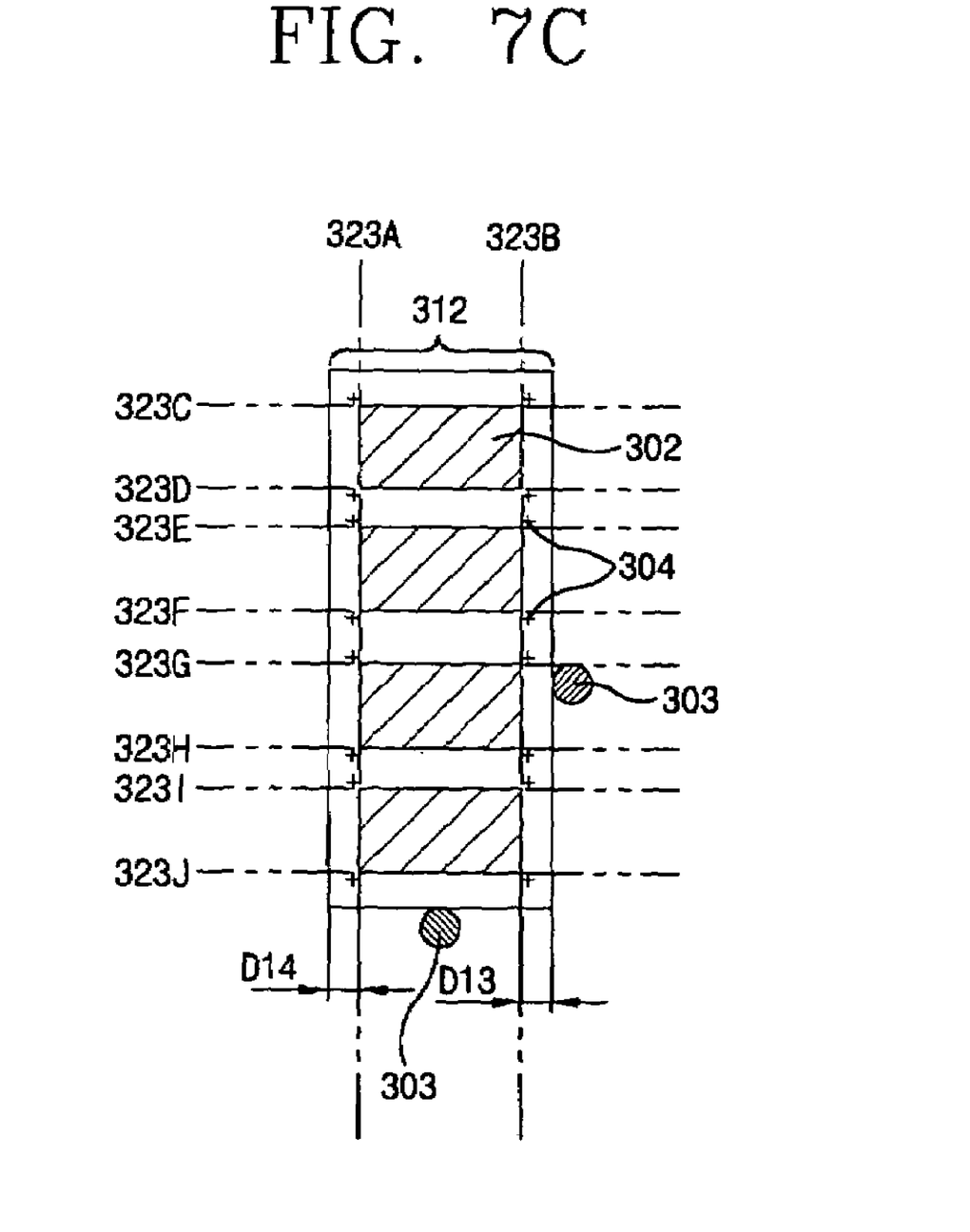

FIGS. 7A to 7C are schematic plan views of another exemplary cutting process of LCD panels according to the present invention. In FIG. 7A, a first region 311 where first-sized LCD panels 301 are formed and a second region 312 where second-sized LCD panels 302 are formed may be loaded onto a cutting apparatus and aligned therewith. Then, a first scribing line 321 may be formed between the first region 311 and the second region 312 to separate the first region 311 and the second region 312. For example, the first scribing line 321 may be formed so that a distance (D11) between the first-sized LCD panels 301 and the first scribing line 321 and a distance (D12) between the first-sized LCD panels 301 and an end portion of the first region 311 may be equal. Alternatively, the first scribing line 321 may be formed so that a distance (D13) between the second-sized LCD panels 302 and the first scribing line 321 and a distance (D14) between the second-sized LCD panels 302 and an end portion of the second region 312 may be equal.

In order to form the first scribing line 321, the first-sized LCD panels 301 and the second-sized LCD panels 302 may be formed on a large-sized mother substrate to include isolation intervals between the first-sized LCD panels 301 and the second-sized LCD panels 302, a distance from an edge of the mother substrate to the first-sized LCD panels 301, and a distance from an edge of the mother substrate to the second-sized LCD panels 302.

A process for cutting out an end portion of the first region 311 may be added after the first scribing line 321 is formed so that a distance (D11) between the first-sized LCD panels 301 and the first scribing line 321, and a distance (D12) between the first-sized LCD panels 301 and an end portion of the first region 311 may be equal. Similary, a process for cutting an end portion of the second region 312 may be added so that a distance (D13) between the second-sized LCD panels 302 and the first scribing line 321, and a distance (D14) between the second-sized LCD panels 302 and an end portion of the second region 312 may be equal.

In FIG. 7B, the separated second region 312 may be loaded onto the cutting apparatus and aligned therewith. Then, second scribing lines 322A-322J may be formed along short sides and long sides of the second-sized LCD panels 302.

In FIG. 7C, the second region 312 may be overturned and aligned with the cutting apparatus. As described above, the first scribing line 321 may be formed so that a distance (D13) between the second-sized LCD panels 302 and the first scribing line 321, and a distance (D14) between the second-sized LCD panels 302 and an end portion of the second region 312 may be equal. Accordingly, when the second region 312 is overturned, positions of the alignment keys 304 formed at corners of the second-sized LCD panels 302 may not have changed. Thus, when the imaging system moves to predetermined reference coordinates, coordinates of the alignment keys 304 formed at the corners of the second-sized LCD panel 302 may be detected. Accordingly, the second region 312 may be aligned with the cutting apparatus without correction of the reference coordinates of the imaging system, thereby reducing time for performing the alignment and improving productivity.

Then, by applying force to the surface of the second region 312, a split may be generated along the second scribing lines 322A-322J, and third scribing lines 323A-323J may be formed along long sides and short sides of the second-sized LCD panels 302.

Then, the second region 312 may be again overturned and aligned with the cutting apparatus. As previously described, since the distance (D13) and the distance (D14) may be equal, positions of the alignment keys 304 formed at corners of the second-sized LCD panels 302 may not have changed. Next, by applying force to the surface of the second region 312, a split may be generated along the third scribing lines 323A-323J. Accordingly, the second-sized LCD panels 302 may be individually separated from the second region 312 by the spilts generated along the second scribing lines 322A-322J and the third scribing lines 323A-323J.

In addition, a method for cutting an LCD panel may also include individually separating the LCD panels 301 of the first region 311 using the process for individually separating the LCD panels 302 of the second region 312. Moreover, according to the present invention, the mother substrate may include additional regions each having different sized LCD panels, wherein the method for cutting an LCD panel may be employed.

It will be apparent to those skilled in the art that various modifications and variations can be made in the method for cutting an LCD panel and an LCD panel fabricated using the same of the present invention without departing from the spirit or scope of the invention. Thus, it is intended that the present invention cover the modifications and variations provided they come within the scope of the appended claims and their equivalents.

What is claimed is:

1. A method for cutting a liquid crystal display panel, comprising the steps of:

providing attached first and second mother substrates having a first region and second region, the attached first and second mother substrate including a first edge at the first region and a second edge at the second region, the first region including a plurality of first-sized LCD panels and the second region including a plurality of second-sized LCD panels;

forming a first scribe line at the area between the first and second regions of the attached first and second mother substrates;

separating the plurality of first-sized LCD panels formed at the first region into individual first-sized LCD panels; and separating the plurality of second-sized LCD panels formed at the second region into individual second-sized LCD panels, the size of the second-sized LCD panels being different from the size of the first-sized LCD panels, wherein a first distance between one of the first-sized LCD panels and the first edge of the first region of the attached first and second mother substrates, and a second distance between one of the first-sized LCD panels and the first scribe line at the area between the first and second regions are equal.

2. The method according to claim 1, wherein the separating the first-sized LCD panels comprises the steps of:

aligning the first region with a cutting apparatus;

forming the first scribing line along long sides and short sides of the first-sized LCD panels along a surface of the first region;

overturning the first region and aligning the first region with the cutting apparatus;

applying force to the surface of the first region;

forming a second scribing line along long sides and short sides of the first-sized LCD panels at the surface of the first region;

overturning the first region and aligning the first region with the cutting apparatus;

applying force to the surface of the first region; and separating the first-sized LCD panels into the individual first-sized LCD panels.

3. The method according to claim 2, wherein the aligning the first region with the cutting apparatus includes a first alignment using a plurality of alignment pins provided at the cutting apparatus; and a second alignment using a plurality of alignment keys formed at corners of the first-sized LCD panels of the first region.

4. The method according to claim 3, wherein the first alignment includes placement of one short side and one long side of the first region to contact the alignment pins.

5. The method according to claim 3, wherein the second alignment includes detecting coordinates of the alignment keys using an imaging system, and positioning of the first region at reference coordinates.

6. The method according to claim 5, wherein the second alignment further includes:

movement of the imaging system to the reference coordinates to detect the coordinates of the alignment keys;

comparison of the detected coordinate of the alignment keys to the reference coordinates; and aligning the first region to the cutting apparatus so that the detected coordinates of the alignment keys correspond to the reference coordinate.

7. The method according to claim 1, wherein the separating the second-sized LCD panels formed at the second region comprises:

aligning the second region with a cutting apparatus;

forming a third scribe line along long sides and short sides of the second-sized LCD panels at a surface of the second region;

overturning the second region and aligning the second region with the cutting apparatus;

applying force to the surface of the second region;

forming a fourth scribe line along long sides and short sides of the second-sized LCD panels at the surface of the second region;

overturning the second region and aligning the second region with the cutting apparatus;

applying force to the surface of the second region; and separating the second-sized LCD panels into the individual second-sized LCD panels.

8. The method according to claim 7, wherein the aligning the second region with the cutting apparatus includes a first alignment using alignment pins provided at the cutting apparatus, and a second alignment using alignment keys formed at corners of the first-sized LCD panels.

9. The method according to claim 1, further comprising the step of removing a part of the first edge of the first region when the first distance is different from the second distance to equalize the first distance to the second distance.

10. The method according to claim 1, wherein a third distance between the second-sized LCD panels and the second edge of the second region is equal to a fourth distance between the second-sized LCD panels and the first scribe line at the area of the between the first and second regions.

11. The method according to claim 10, further comprising the step of removing a part of the second edge of the second region when the third distance is different from the third distance to equalize the third distance to the fourth distance.

12. A method for fabricating individual liquid crystal display cells, comprising the steps of:

providing first and second mother substrates having a first region and second region, the first region including a plurality of first-sized LCD panels and the second region including a plurality of second-sized LCD panels;

attaching first and second mother substrates together;

forming a first scribe line within a first scribe line region between the first and second regions of the attached first and second mother substrates;

removing an end portion of the first region to equalize a first distance between one of the first-sized LCD panels and the first edge of the first region to a second distance between one of the first-sized LCD panels and the first scribe line at the area of the between the first and second regions;

removing an end portion of the second region to equalize a third distance between one of the second-sized LCD panels and the second edge of the second region to a fourth distance between one of the second-sized LCD panels and the first scribe line at the area between the first and second regions;

separating the plurality of first-sized LCD panels formed at the first region into individual first-sized LCD cells; and separating the plurality of second-sized LCD panels formed at the second region into individual second-sized LCD cells, the size of the second-sized LCD panels being different from the size of the first-sized LCD panels.

13. The method according to claim 12, wherein the separating the first-sized LCD panels comprises the steps of:

aligning the first region with a cutting apparatus;

forming the first scribing line along long sides and short sides of the first-sized LCD panels along a surface of the first region;

overturning the first region and aligning the first region with the cutting apparatus;

applying force to the surface of the first region;

forming a second scribing line along long sides and short sides of the first-sized LCD panels at the surface of the first region;

overturning the first region and aligning the first region with the cutting apparatus;

applying force to the surface of the first region; and separating the first-sized LCD panels into the individual first-sized LCD panels.

14. The method according to claim 13, wherein the aligning the first region with the cutting apparatus includes a first alignment using a plurality alignment pins provided at the cutting apparatus, and a second alignment using a plurality of alignment keys formed at corners of the first-sized LCD panels of the first region.

15. The method according to claim 14, wherein the first alignment includes placement of one short side and one long side of the first region to contact the alignment pins.

16. The method according to claim 15, wherein the second alignment includes detecting coordinates of the alignment keys using an imaging system, and positioning of the first region at reference coordinates.

17. The method according to claim 16, wherein the second alignment further includes:
   movement of the imaging system to the reference coordinates to detect the coordinates of the alignment keys;
   comparison of the detected coordinate of the alignment keys to the reference coordinates; and
   aligning the first region to the cutting apparatus so that the detectedcoordinates of the alignment keys correspond to the reference coordinate.

18. The method according to claim 12, wherein the separating the second-sized LCD panels formed at the second region comprises:
   aligning the second region with a cutting apparatus;
   forming a third scribe line along long sides and short sides of the second-sized LCD panels at a surface of the second region;
   overturning the second region and aligning the second region with the cutting apparatus;
   applying force to the surface of the second region;
   forming a fourth scribe line along long sides and short sides of the second-sized LCD panels at the surface of the second region;
   overturning the second region and aligning the second region with the cutting apparatus;
   applying force to the surface of the second region; and
   separating the second-sized LCD panels into the individual second-sized LCD panels.

19. The method according to claim 18, wherein the aligning the second region with the cutting apparatus includes a first alignment using alignment pins provided at the cutting apparatus, and a second alignment using alignment keys formed at corners of the first-sized LCD panels.

* * * * *